(12) United States Patent
Fu

(10) Patent No.: US 9,906,435 B2
(45) Date of Patent: Feb. 27, 2018

(54) METHOD AND APPARATUS FOR DETERMINING INTERMEDIATE ROUTING NODE AND SYSTEM

(71) Applicant: Huawei Technologies Co., Ltd., Shenzhen (CN)

(72) Inventor: Binzhang Fu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/333,500

(22) Filed: Oct. 25, 2016

(65) Prior Publication Data

US 2017/0041216 A1 Feb. 9, 2017

Related U.S. Application Data

(63) Continuation of application No. PCT/CN2015/070038, filed on Jan. 4, 2015.

(30) Foreign Application Priority Data

Apr. 30, 2014 (CN) .......................... 2014 1 0182254

(51) Int. Cl.
*H04L 12/707* (2013.01)
*H04L 12/24* (2006.01)
(Continued)

(52) U.S. Cl.
CPC .......... *H04L 45/22* (2013.01); *H04L 41/0668* (2013.01); *H04L 45/02* (2013.01); *H04L 45/18* (2013.01); *H04L 45/28* (2013.01)

(58) Field of Classification Search
CPC ......... H04L 45/02; H04L 45/18; H04L 45/22; H04L 45/28; H04L 41/0654; H04L 41/0668
See application file for complete search history.

(56) References Cited

U.S. PATENT DOCUMENTS

| 4,933,933 A | 6/1990 | Dally et al. |
| 2005/0073958 A1* | 4/2005 | Atlas ....................... H04L 45/00 370/238 |

(Continued)

FOREIGN PATENT DOCUMENTS

| CN | 1486020 A | 3/2004 |
| CN | 102761475 A | 10/2012 |

(Continued)

OTHER PUBLICATIONS

Machine Translation and Abstract of Chinese Publication No. CN1486020, Mar. 31, 2004, 13 pages.

(Continued)

*Primary Examiner* — Gary Mui
(74) *Attorney, Agent, or Firm* — Conley Rose, P.C.

(57) ABSTRACT

A method for determining an intermediate routing node, including: determining at least one intermediate routing node that is used to transfer to-be-transmitted data between the two routing nodes when there is a fault in a communication path between two routing nodes, adding a channel dependency relationship between a to-be-verified intermediate routing node and the two routing nodes to a channel dependency graph of a routing network in which this fault has not occurred in order to enable the channel dependency graph to become an updated channel dependency graph, and determining the to-be-verified intermediate routing node as a final intermediate routing node that is used to transfer the to-be-transmitted data when the updated channel dependency graph does not have a dependency relationship loop. The determined intermediate routing node can be used to transfer to-be-transmitted data, which improves resource utilization of a routing network.

10 Claims, 9 Drawing Sheets

(51) Int. Cl.
*H04L 12/703* (2013.01)
*H04L 12/751* (2013.01)
*H04L 12/705* (2013.01)

(56) References Cited

U.S. PATENT DOCUMENTS

| | | | |
|---|---|---|---|
| 2013/0194913 A1 | 8/2013 | Sun et al. | |
| 2013/0301403 A1 | 11/2013 | Esale et al. | |
| 2014/0068132 A1 | 3/2014 | Philip et al. | |
| 2015/0163091 A1* | 6/2015 | Thubert | H04L 41/0668 370/225 |
| 2015/0263936 A1 | 9/2015 | Thubert et al. | |

FOREIGN PATENT DOCUMENTS

| | | |
|---|---|---|
| CN | 103179034 A | 6/2013 |
| CN | 103391247 A | 11/2013 |
| CN | 103493441 A | 1/2014 |

OTHER PUBLICATIONS

Foreign Communication From a Counterpart Application, Chinese Application No. 201410182254.X, Chinese Office Action dated Sep. 29, 2017, 6 pages.

Ho, C., et al., "A New Approach to Fault-Tolerant Wormhole Routing for Mesh-Connected Parallel Computers," IEEE Transactions on Computers, vol. 53, No. 4, Apr. 2004, pp. 427-438.

Engracia, M., et al., "A Routing Methodology for Achieving Fault Tolerance in Direct Networks," IEEE Transactions on Computers, vol. 55, No. 4, Apr. 2006, pp. 400-415.

Fu, B., et al., "A New Multiple-Round Dimension-Order Routing for Networks-on-Chip," IEICE Trans. INF & Syst., vol. E94-D, No. 4, Apr. 2011, pp. 809-821.

Foreign Communication From a Counterpart Application, PCT Application No. PCT/CN2015/070038, English Translation of International Search Report dated Apr. 14, 2015, 2 pages.

Foreign Communication From a Counterpart Application, PCT Application No. PCT/CN2015/070038, English Translation of Written Opinion dated Apr. 14, 2015, 5 pages.

Foreign Communication From a Counterpart Application, PCT Application No. PCT/CN2015/070038, International Search Report dated Apr. 14, 2015, 3 pages.

Foreign Communication From a Counterpart Application, PCT Application No. PCT/CN2015/070038, Written Opinion dated Apr. 14, 2015, 3 pages.

Lee, T., et al., "A Fault-Tolerant Communication Scheme for Hypercube Computers," XP000328602, IEEE Transaction on Computers, vol. 41, No. 10, Oct. 1992, pp. 1242-1456.

Kim, J., et al., "A Fault-Tolerant Wormhole Routing Algorithm in Two Dimensional Mesh Networks," XP000767291, IEICE Trans. & Syst., vol. E81-D, No. 6, Jun. 1998, pp. 532-544.

Lysne, O., et al., "One-fault tolerance and beyond in wormhole routed meshes," XP004123980, Microprocessors and Microsystems, vol. 21, No. 7-8, Mar. 30, 1998, pp. 471-480.

Foreign Communication From a Counterpart Application, European Application No. 15785832.5, Extended European Search Report dated Mar. 24, 2017, 4 pages.

* cited by examiner

METHOD AND APPARATUS FOR DETERMINING INTERMEDIATE ROUTING NODE AND SYSTEM

CROSS-REFERENCE TO RELATED APPLICATIONS

This application is a continuation of International Application No. PCT/CN2015/070038, filed on Jan. 4, 2015, which claims priority to Chinese Patent Application No. 201410182254.X, filed on Apr. 30, 2014, both of which are hereby incorporated by reference in their entireties.

TECHNICAL FIELD

The present disclosure relates to the field of communications technologies, and to a method and apparatus for determining an intermediate routing node, and a system.

BACKGROUND

In a routing network, a fault in the network may cause a communication path between a source routing node and a destination routing node to be blocked, resulting in termination of data transmission. In this case, in some approaches, a fault-tolerant routing technology is generally used, in which a network fault is tolerated by bypassing a fault point and a reliable communication service is provided for a user.

After a fault occurs in a transmission path between a source node (S) and a destination node (D) in a routing network, a management node finds an intermediate routing node (I) for an affected node pair (S, D). The I needs to meet two conditions: (1) There is no fault in a path from S to I, (2) There is no fault in a path from I to D. After I is found, a message originally sent from S to D is first sent from S to I (a routing phase 1) and then forwarded from I to D (a routing phase 2).

In an existing routing network, for ensuring that no routing deadlock occurs, after an I is added, a message routed from S to D experiences two phases: from S to I and from I to D. In some approaches, to ensure that no routing deadlock occurs after a message passes the I, the message is switched to a new virtual channel when passing the I and a serial number of the virtual channel needs to be monotonic. For example, a first virtual channel is used in a routing phase 1 and a second virtual channel is used in a routing phase 2.

In the prior art, a routing deadlock is prevented using a virtual channel method, which has a relatively high resource requirement. For example, n+1 virtual channels need to be used when n intermediate routing nodes are required for use. These virtual channels are not in use if there is no fault, and therefore, resources are severely wasted and network resource utilization is low. In addition, in most cases, a fault area can be bypassed with only a small quantity of intermediate routing nodes. However, the system must reserve resources according to a worst case, resulting in severely unbalanced resource utilization and leading to poor system performance.

SUMMARY

Embodiments of the present disclosure provide a method for determining an intermediate routing node. An intermediate routing node that does not have a dependency relationship loop in a channel dependency graph may be determined by verifying, before determining the intermediate routing node, whether the intermediate routing node constitutes a dependency relationship loop in the channel dependency graph. When a communication fault occurs between two routing nodes, to-be-transmitted data may be transferred using only one intermediate routing node, without requiring that multiple virtual channels be in an idle and ready state. This improves resource utilization of a routing network. The embodiments of the present disclosure further provide a corresponding apparatus and system.

A first aspect of the present disclosure provides a method for determining an intermediate routing node, including determining at least one intermediate routing node that is used to transfer to-be-transmitted data between the two routing nodes when there is a fault in a communication path between two routing nodes, adding a channel dependency relationship between a to-be-verified intermediate routing node and the two routing nodes to a channel dependency graph of a routing network in which this fault has not occurred in order to enable the channel dependency graph to become an updated channel dependency graph, where the to-be-verified intermediate routing node is any one of the at least one intermediate routing node, the channel dependency relationship is a combination of channels in which the two routing nodes perform data transmission using the to-be-verified intermediate routing node, and the channel dependency graph of the routing network in which this fault has not occurred is used to describe a dependency relationship constituted by any two channels in the routing network in which this fault has not occurred, or a combination of a dependency relationship constituted by any two channels in the routing network in which this fault has not occurred and a channel dependency relationship that is established before the fault, and determining the to-be-verified intermediate routing node as a final intermediate routing node that is used to transfer the to-be-transmitted data when the updated channel dependency graph does not have a dependency relationship loop, where the dependency relationship loop is a loop constituted by a channel dependency relationship combination.

With reference to the first aspect, in a first possible implementation manner, the adding a channel dependency relationship between a to-be-verified intermediate routing node and the two routing nodes to a channel dependency graph of a routing network in which this fault has not occurred in order to enable the channel dependency graph to become an updated channel dependency graph includes searching, according to a transmission direction of the to-be-transmitted data, the channel dependency graph of the routing network in which this fault has not occurred, to find a last channel in a path between a source routing node of the two routing nodes and the to-be-verified intermediate routing node and a first channel in a path between the to-be-verified intermediate routing node and a destination routing node of the two routing nodes, determining the last channel in the path between the source routing node and the to-be-verified intermediate routing node as a dependency start channel, determining the first channel in the path between the to-be-verified intermediate routing node and the destination routing node as a dependency end channel, and adding, to the channel dependency graph of the routing network in which this fault has not occurred, a channel dependency relationship that is from the dependency start channel to the dependency end channel such that the channel dependency graph of the routing network in which this fault has not occurred becomes the updated channel dependency graph.

With reference to the first aspect or the first possible implementation manner of the first aspect, in a second possible implementation manner, the determining at least one intermediate routing node that is used to transfer to-be-transmitted data between the two routing nodes includes obtaining, as a first information set, information about a routing node in a fault-free communication connection to the source routing node of the two routing nodes, obtaining, as a second information set, information about a routing node in a fault-free communication connection to the destination routing node of the two routing nodes, calculating an intersection set of the first information set and the second information set, and determining, as the at least one intermediate routing node, a routing node corresponding to routing node information included in the intersection set.

With reference to the first aspect or the first possible implementation manner of the first aspect, in a third possible implementation manner, before the adding a channel dependency relationship between a to-be-verified intermediate routing node and the two routing nodes to a channel dependency graph of a routing network in which this fault has not occurred in order to enable the channel dependency graph to become an updated channel dependency graph, the method further includes obtaining, as the channel dependency graph of the routing network in which this fault has not occurred, a channel dependency graph that does not include a dependency relationship loop and that is obtained a channel dependency relationship is added at a previous time.

With reference to the first aspect or the first possible implementation manner of the first aspect, in a fourth possible implementation manner, the method further includes sending description information of the final intermediate routing node to the source routing node of the two routing nodes such that the source routing node sends the to-be-transmitted data to the final intermediate routing node.

A second aspect of the present disclosure provides an apparatus for determining an intermediate routing node, including a first determining unit configured to determine at least one intermediate routing node that is used to transfer to-be-transmitted data between the two routing nodes when there is a fault in a communication path between two routing nodes, a channel dependency graph update unit configured to add a channel dependency relationship between a to-be-verified intermediate routing node and the two routing nodes to a channel dependency graph of a routing network in which this fault has not occurred in order to enable the channel dependency graph to become an updated channel dependency graph, where the to-be-verified intermediate routing node is any one of the at least one intermediate routing node determined by the determining unit, the channel dependency relationship is a combination of channels in which the two routing nodes perform data transmission using the to-be-verified intermediate routing node, and the channel dependency graph of the routing network in which this fault has not occurred is used to describe a dependency relationship constituted by any two channels in the routing network in which this fault has not occurred, or a combination of a dependency relationship constituted by any two channels in the routing network in which this fault has not occurred and a channel dependency relationship that is established before the fault, and a second determining unit configured to determine the to-be-verified intermediate routing node as a final intermediate routing node that is used to transfer the to-be-transmitted data when the updated channel dependency graph updated by the channel dependency graph update unit does not have a dependency relationship loop, where the dependency relationship loop is a loop constituted by a channel dependency relationship combination.

With reference to the second aspect, in a first possible implementation manner, the channel dependency graph update unit includes a search subunit configured to search, according to a transmission direction of the to-be-transmitted data, the channel dependency graph of the routing network in which this fault has not occurred, to find a last channel in a path between a source routing node of the two routing nodes and the to-be-verified intermediate routing node and a first channel in a path between the to-be-verified intermediate routing node and a destination routing node of the two routing nodes, a determining subunit configured to determine the last channel, found by the search subunit, in the path between the source routing node and the to-be-verified intermediate routing node as a dependency start channel, and determine the first channel, found by the search subunit, in the path between the to-be-verified intermediate routing node and the destination routing node as a dependency end channel, and an establishment subunit configured to add, to the channel dependency graph of the routing network in which this fault has not occurred, a channel dependency relationship that is from the dependency start channel to the dependency end channel, where the dependency start channel and the dependency end channel are determined by the determining subunit such that the channel dependency graph of the routing network in which this fault has not occurred becomes the updated channel dependency graph.

With reference to the second aspect or the first possible implementation manner of the second aspect, in a second possible implementation manner, the first determining unit includes a first obtaining subunit configured to obtain, as a first information set, information about a routing node in a fault-free communication connection to the source routing node of the two routing nodes, a second obtaining subunit configured to obtain, as a second information set, information about a routing node in a fault-free communication connection to the destination routing node of the two routing nodes, a calculation subunit configured to calculate an intersection set of the first information set obtained by the first obtaining subunit and the second information set obtained by the second obtaining subunit, and a determining subunit configured to determine, as the at least one intermediate routing node, a routing node corresponding to routing node information included in the intersection set calculated by the calculation subunit.

With reference to the second aspect or the first possible implementation manner of the second aspect, in a third possible implementation manner, the apparatus further includes an obtaining unit configured to before the channel dependency graph update unit updates the channel dependency graph of the routing network in which this fault has not occurred, obtain, as the channel dependency graph of the routing network in which this fault has not occurred, a channel dependency graph that does not include a dependency relationship loop and that is obtained a channel dependency relationship is added at a previous time.

With reference to the second aspect or the first possible implementation manner of the second aspect, in a fourth possible implementation manner, the apparatus further includes a sending unit configured to send description information of the final intermediate routing node determined by the second determining unit to the source routing node of the two routing nodes such that the source routing node sends the to-be-transmitted data to the final intermediate routing node.

A third aspect of the present disclosure provides a routing control system, including a routing node and a management node, where the routing node is in a communication connection in a manner defined according to a network topology, and there is a communication connection between the management node and any routing node of the routing node, and the management node is configured to determine at least one intermediate routing node that is used to transfer to-be-transmitted data between the two routing nodes when there is a fault in a communication path between two routing nodes, add a channel dependency relationship between a to-be-verified intermediate routing node and the two routing nodes to a channel dependency graph of a routing network in which this fault has not occurred in order to enable the channel dependency graph to become an updated channel dependency graph, where the to-be-verified intermediate routing node is any one of the at least one intermediate routing node, the channel dependency relationship is a combination of channels in which the two routing nodes perform data transmission using the to-be-verified intermediate routing node, and the channel dependency graph of the routing network in which this fault has not occurred is used to describe a channel constituted by any two routing nodes in the routing network in which this fault has not occurred, or a combination of a channel constituted by any two routing nodes in the routing network in which this fault has not occurred and a channel dependency relationship that is established before the fault, and determine the to-be-verified intermediate routing node as a final intermediate routing node that is used to transfer the to-be-transmitted data when the updated channel dependency graph does not have a dependency relationship loop, where the dependency relationship loop is a loop constituted by a channel dependency relationship combination.

In the embodiments of the present disclosure, when there is a fault in a communication path between two routing nodes, at least one intermediate routing node that is used to transfer to-be-transmitted data between the two routing nodes is determined, a channel dependency relationship between a to-be-verified intermediate routing node and the two routing nodes is added to a channel dependency graph of a routing network in which this fault has not occurred in order to enable the channel dependency graph to become an updated channel dependency graph, where the to-be-verified intermediate routing node is any one of the at least one intermediate routing node, the channel dependency relationship is a combination of channels in which the two routing nodes perform data transmission using the to-be-verified intermediate routing node, and the channel dependency graph of the routing network in which this fault has not occurred is used to describe a dependency relationship constituted by any two channels in the routing network in which this fault has not occurred, or a combination of a dependency relationship constituted by any two channels in the routing network in which this fault has not occurred and a channel dependency relationship that is established before the fault, and when the updated channel dependency graph does not have a dependency relationship loop, the to-be-verified intermediate routing node is determined as an intermediate routing node that is used to transfer the to-be-transmitted data, where the dependency relationship loop is a loop constituted by a channel dependency relationship combination of a routing node. In comparison with the conventional approaches in which data transfer needs to depend on multiple virtual channels to prevent a routing deadlock, according to the method provided in the embodiments of the present disclosure, an intermediate routing node that does not have a dependency relationship loop in a channel dependency graph may be determined by verifying, before determining the intermediate routing node, whether the intermediate routing node constitutes a dependency relationship loop in the channel dependency graph. When a communication fault occurs between two routing nodes, to-be-transmitted data may be transferred using only one intermediate routing node, without requiring that multiple virtual channels be in an idle and ready state. This improves resource utilization of a routing network. Therefore, in a network with same resources as a network in the conventional approaches, a fault-tolerance capability is more powerful and network performance is better in this solution.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person skilled in the art may still derive other drawings from these accompanying drawings without creative efforts.

DESCRIPTION OF EMBODIMENTS

Embodiments of the present disclosure provide a method for determining an intermediate routing node, in which an intermediate routing node that does not have a dependency relationship loop in a channel dependency graph may be determined by verifying, before determining the intermediate routing node, whether the intermediate routing node constitutes a dependency relationship loop in the channel dependency graph. When a communication fault occurs between two routing nodes, to-be-transmitted data may be transferred using only one intermediate routing node, without requiring that multiple virtual channels be in an idle and ready state. This improves resource utilization of a routing network. The embodiments of the present disclosure further provide a corresponding apparatus and system. The following provides detailed description separately.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

Figure 1:
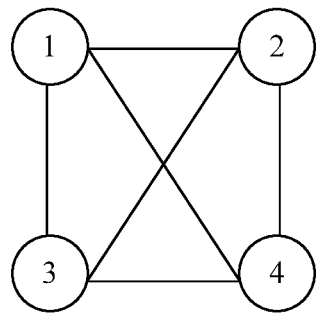
FIG. 1 is a schematic diagram of an embodiment of a method for determining an intermediate routing node according to the embodiments of the present disclosure.
Figure 2:
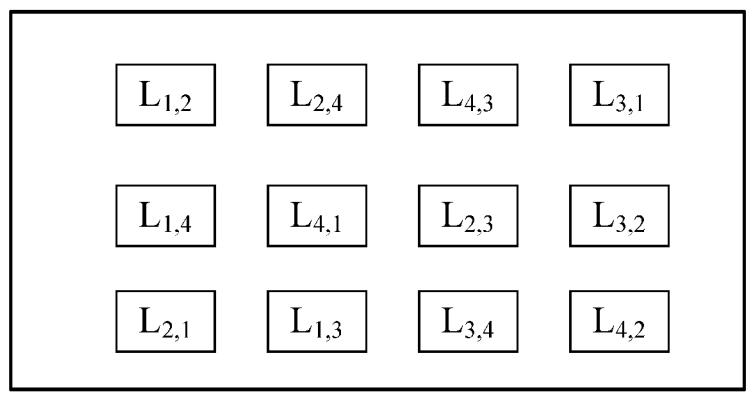
FIG. 2 is a schematic diagram of another embodiment of a method for determining an intermediate routing node according to the embodiments of the present disclosure.

As shown in FIG. 1, FIG. 1 is a schematic diagram of an example of a routing network according to an embodiment of the present disclosure. In this embodiment of the present disclosure, a fully interconnected routing network that includes four routing nodes is used as an example. When there is no fault in the routing network, because any two routing nodes in the fully interconnected routing network shown in FIG. 1 may directly transmit data, data transmission between any two routing nodes does not need to depend on another routing node for forwarding, and therefore, there is no channel dependency relationship. A channel dependency graph corresponding to FIG. 1 is shown in FIG. 2. The channel dependency graph shown in FIG. 2 may also be understood as an original channel dependency graph.

The channel dependency graph is defined as follows: Each channel shown in FIG. 1 is denoted by a node in the channel dependency graph, and a symbol $L_{1,2}$ in the channel dependency graph denotes a channel from a node 1 to a node 2. It is assumed that there is an arrow between $L_{1,2}$ and $L_{2,4}$, and this indicates that the channel $L_{1,2}$ depends on the channel $L_{2,4}$.

As shown in FIG. 2, there is no channel dependency relationship in a current channel dependency graph.

Figure 3:
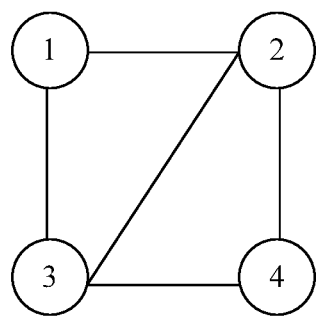
FIG. 3 is a schematic diagram of another embodiment of a method for determining an intermediate routing node according to the embodiments of the present disclosure.

As shown in FIG. 3, when a communication fault occurs between a routing node 1 and a routing node 4, the routing node 1 cannot directly communicate with the routing node 4. To transmit a message from the routing node 1 to the routing node 4 when there is a fault, main steps of this embodiment of the present disclosure are as follows:

Step 1: Construct a channel dependency graph, as shown in FIG. 2.

Step 2: Find a set Sr={2, 3} of all routing nodes that can be reached from the routing node 1 in any path.

Step 3: Find a set Ds={2, 3} of all routing nodes that can reach the destination routing node 4 in any path.

Step 4: Calculate an intersection set Isd={2, 3} of Sr and Ds such that it may be determined that intermediate routing nodes that are used to transfer to-be-transmitted data between the routing nodes 1 and 4 are routing node 2 and routing node 3.

Figure 4A:
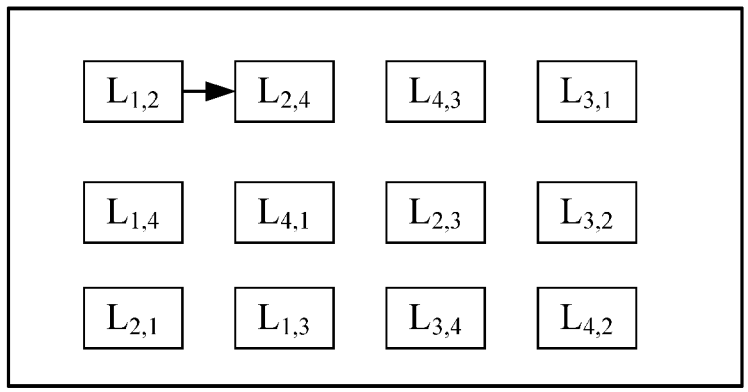
FIG. 4A is a schematic diagram of another embodiment of a method for determining an intermediate routing node according to the embodiments of the present disclosure.

Step 5: First, select the routing node 2 as a to-be-verified intermediate routing node. Hence, a communication path from the routing node 1 to the routing node 4 is 1->2->4, that is, a communication path between the routing node 1 and the routing node 4 is constituted by connecting the channel $L_{1,2}$ and the channel $L_{2,4}$ in series. Channels from the source routing node to the to-be-verified intermediate routing node are respectively defined as a first channel, a second channel, . . . , and a last channel starting from the source routing node, and channels from the to-be-verified intermediate routing node to the destination routing node are respectively defined as a first channel, a second channel, . . . , and a last channel starting from the to-be-verified intermediate routing node. In this way, in the communication path from the routing node 1 to the routing node 4, a last channel in a communication path from the routing node 1 to the routing node 2 is $L_{1,2}$ and $L_{1,2}$ may be used as a dependency start channel. A first channel in a communication path from the routing node 2 to the routing node 4 is $L_{2,4}$ and $L_{2,4}$ may be used as a dependency end channel. Therefore, a channel dependency relationship $L_{1,2}$->$L_{2,4}$ from $L_{1,2}$ to $L_{2,4}$ is added to the channel dependency graph, that is, FIG. 2. As shown in FIG. 4A, a corresponding side is added to a channel dependency graph 2. It can be found that there is no dependency relationship loop in FIG. 4A in this case. Therefore, the routing node 2 is used as a final intermediate routing node for communication from the routing node 1 to the node 4.

Figure 4B:
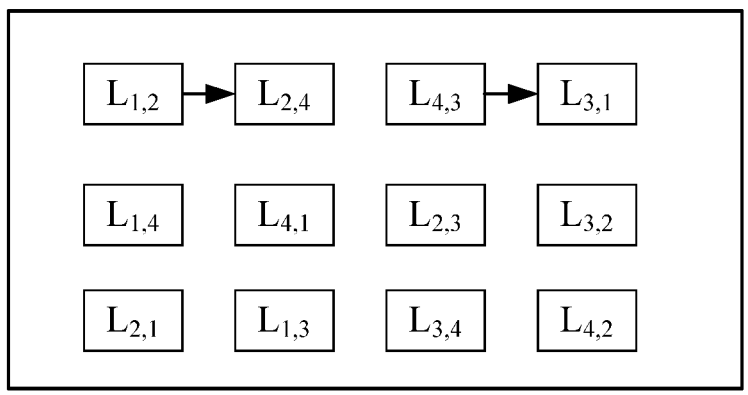
FIG. 4B is a schematic diagram of another embodiment of a method for determining an intermediate routing node according to the embodiments of the present disclosure.

Similarly, it may be obtained by means of calculation that a routing node 3 may be used as a final intermediate routing node from the routing node 4 to the routing node 1, and a channel dependency relationship $L_{4,3}$->$L_{3,1}$ from $L_{4,3}$ to $L_{3,1}$ is added to FIG. 4A. As shown in FIG. 4B, there is still no dependency relationship loop in a channel dependency graph. Therefore, the routing node 3 may be used as a final intermediate routing node from the routing node 4 to the routing node 1.

Figure 5:
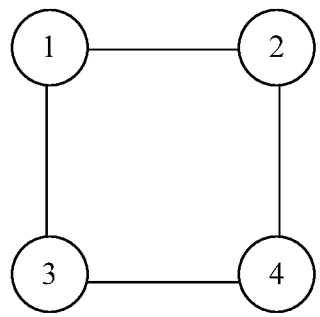
FIG. 5 is a schematic diagram of another embodiment of a method for determining an intermediate routing node according to the embodiments of the present disclosure.
Figure 6:
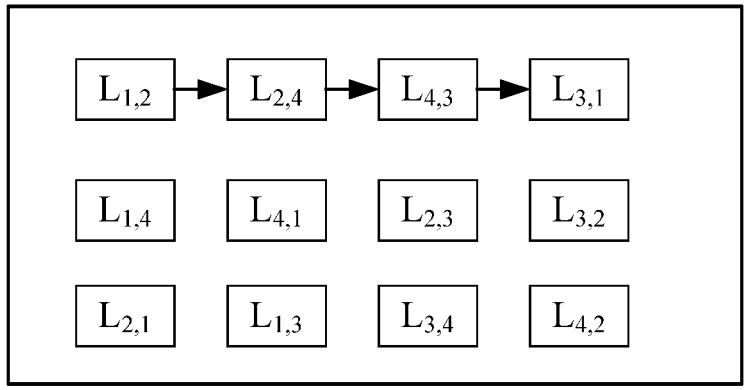
FIG. 6 is a schematic diagram of another embodiment of a method for determining an intermediate routing node according to the embodiments of the present disclosure.

After a communication fault occurs between the routing node 1 and the routing node 4, in this case, if a fault also occurs in communication between the routing node 2 and the routing node 3, as shown in FIG. 5, to transmit a message from the routing node 2 to the routing node 3 in a fault case, a channel dependency relationship between the routing node 2 and the routing node 3 with presence of a communication fault may be added to the channel dependency graph in FIG. 4B, and the foregoing step 2, step 3, and step 4 may be repeated. Finally, a set Isd={1,4} of routing nodes that may be used as intermediate routing nodes is obtained. When the routing node 4 is selected as a to-be-verified intermediate routing node, in this case, a channel dependency relationship $L_{2,4}$->$L_{4,3}$ is added to FIG. 4B. In this case, an updated channel dependency graph is shown in FIG. 6. Because there is no dependency relationship loop in the updated channel dependency graph shown in FIG. 6, it may be determined that the routing node 4 may be used as a final intermediate routing node for communication from the routing node 2 to the routing node 3.

Figure 7:
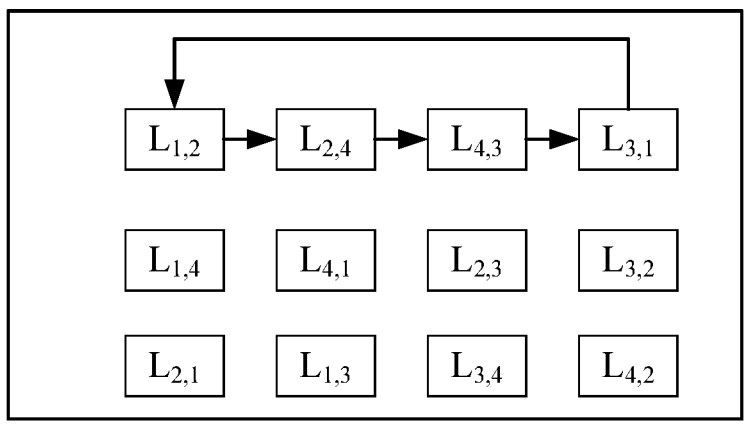
FIG. 7 is a schematic diagram of another embodiment of a method for determining an intermediate routing node according to the embodiments of the present disclosure.
Figure 8:
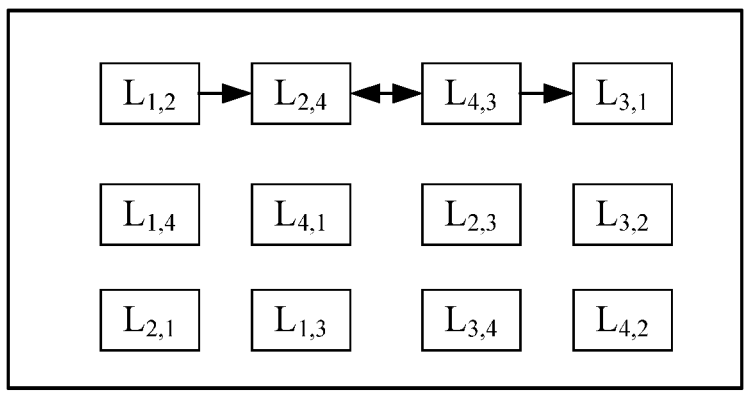
FIG. 8 is a schematic diagram of another embodiment of a method for determining an intermediate routing node according to the embodiments of the present disclosure.

To transmit a message from the routing node 3 to the routing node 2, if the routing node 1 is selected as a to-be-verified intermediate routing node, a channel dependency relationship $L_{3,1} \rightarrow L_{1,2}$ is added to the channel dependency graph in FIG. 6. In this case, an updated channel dependency graph is shown in FIG. 7. It may be found that there is a dependency relationship loop in the updated channel dependency graph in FIG. 7. Therefore, the routing node 1 cannot be used as an intermediate routing node for communication from the routing node 3 to the routing node 2. In addition, a channel dependency graph that has a dependency relationship loop does not need to be saved, because no channel dependency graph that includes a dependency relationship loop will be used for next addition of a channel dependency relationship. Then, the routing node 4 may be tried again and a channel dependency relationship $L_{3,4} \rightarrow L_{4,2}$ is added to the channel dependency graph in FIG. 6. In this case, an updated channel dependency graph is shown in FIG. 8. Because there is no dependency relationship loop in the channel dependency graph shown in FIG. 8, it is determined that the routing node 4 may be used as a final intermediate routing node for communication from the routing node 3 to the routing node 2.

Figure 9:
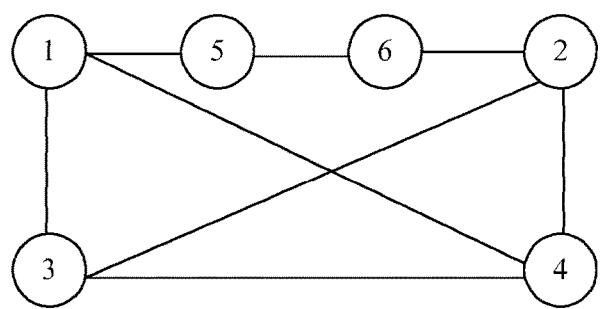
FIG. 9 is a schematic diagram of another embodiment of a method for determining an intermediate routing node according to the embodiments of the present disclosure.

FIG. 9 is a schematic diagram of another embodiment of a routing network according to the embodiments of the present disclosure. In this embodiment of the present disclosure, for example, six routing nodes are included. When there is no fault in the routing network shown in FIG. 9, a routing node 1 in the routing network shown in FIG. 9 can separately perform direct communication with a routing node 5, a routing node 3, and a routing node 4. However, in communication with a routing node 2, the routing node 1 needs to depend on the routing node 3 or the routing node 4 (in this case, it is assumed that an Up*/Down* routing algorithm is used), and the routing node 2 can perform direct communication with the routing node 3 and the routing node 4. A channel dependency graph corresponding to FIG. 9 needs to enable any two routing nodes in FIG. 9 to perform communication, and to perform direct communication if direct communication can be performed, or to perform indirect communication using another routing node if direct communication cannot be performed. In addition, when indirect communication is performed, other routing nodes that are used should be as few as possible. Therefore, the channel dependency graph corresponding to the routing network shown in FIG. 9 is shown in FIG. 10.

Figure 10:
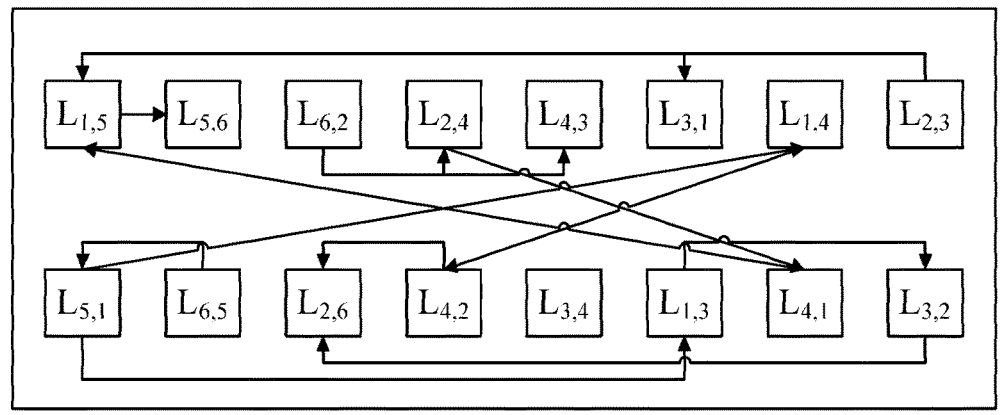
FIG. 10 is a schematic diagram of an embodiment of an apparatus for determining an intermediate routing node according to the embodiments of the present disclosure.

For the routing networks shown in FIG. 9 and FIG. 10, when a communication fault occurs between the routing node 1 and the routing node 4, a set Sr={2, 3, 5, 6} of all routing nodes that can reach the routing node 1 in any path is found, and a set Ds={2, 3, 6} of all routing nodes that can reach the routing node 4 in any path is found, and an intersection set Isd={2, 3, 6} of Sr and Ds is obtained by means of calculation. Therefore, it may be further determined that intermediate routing nodes that are used to transfer to-be-transmitted data are the routing node 2, the routing node 3, or the routing node 6. It is assumed that the routing node 2 is used as a to-be-verified intermediate routing node from the routing node 1 to the routing node 4, a last channel in a communication path between the routing node 1 and the routing node 2 is $L_{3,2}$ and the channel $L_{3,2}$ may be used as a dependency start channel, and a first channel in a communication path between the routing node 2 and the routing node 4 is $L_{2,4}$ and the channel $L_{2,4}$ may be used as a dependency end channel. Therefore, a channel dependency relationship $L_{3,2} \rightarrow L_{2,4}$ from the channel $L_{3,2}$ to the channel $L_{2,4}$ is added to a channel dependency graph in which this fault has not occurred, for example, FIG. 10. A new dependency relationship is added to the channel dependency graph shown in FIG. 10 to obtain an updated channel dependency graph. There is no dependency relationship loop in the updated channel dependency graph. Therefore, the routing node 2 may be used as a final intermediate routing node between the routing node 1 and the routing node 4.

In this embodiment of the present disclosure, a communication path between a source routing node, a to-be-verified intermediate routing node, and a destination routing node is constituted by connecting multiple channels in series. Channels from the source routing node to the to-be-verified intermediate routing node are respectively defined as a first channel, a second channel, . . . , and a last channel starting from the source routing node, and channels from the to-be-verified intermediate routing node to the destination routing node are respectively defined as a first channel, a second channel, . . . , and a last channel starting from the to-be-verified intermediate routing node.

In this embodiment of the present disclosure, when there is a fault between the routing node 1 and the routing node 4 and there is also a fault between the routing node 2 and the routing node 3, a process is the same as that described in the foregoing FIG. 1 to FIG. 8. In FIG. 9 and FIG. 10, it is only emphasized that a channel dependency graph is determined depending on a communication relationship, between routing nodes, predefined in a routing network. Not every two routing nodes can perform direct communication; however, two routing nodes can depend on another routing node to implement communication.

Figure 11:
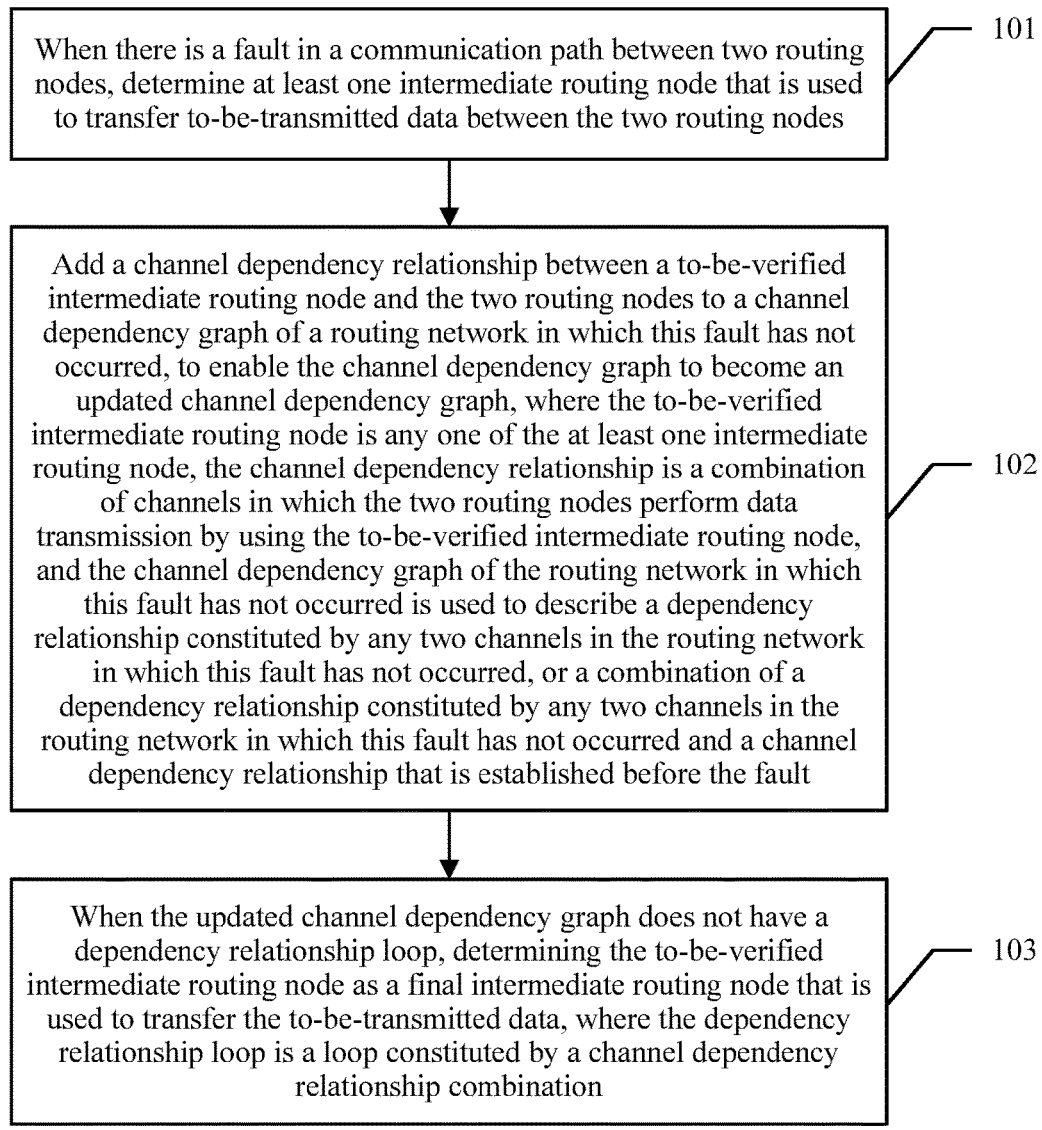
FIG. 11 is a schematic diagram of an embodiment of a method for determining an intermediate routing node according to the embodiments of the present disclosure.

Referring to FIG. 11, an embodiment of a method for determining an intermediate routing node according to the embodiments of the present disclosure includes:

Step 101. Determine at least one intermediate routing node that is used to transfer to-be-transmitted data between the two routing nodes when the updated channel dependency graph does not have a dependency relationship loop.

Step 102. Add a channel dependency relationship between a to-be-verified intermediate routing node and the two routing nodes to a channel dependency graph of a routing network in which this fault has not occurred in order to enable the channel dependency graph to become an updated channel dependency graph.

The to-be-verified intermediate routing node is any one of the at least one intermediate routing node, the channel dependency relationship is a combination of channels in which the two routing nodes perform data transmission using the to-be-verified intermediate routing node, and the channel dependency graph of the routing network in which this fault has not occurred is used to describe a dependency relationship constituted by any two channels in the routing network in which this fault has not occurred, or a combination of a dependency relationship constituted by any two channels in the routing network in which this fault has not occurred and a channel dependency relationship that is established before the fault.

Because a routing network has a fault-tolerance capability, recovery does not need to be performed once a fault occurs. After the routing network becomes faulty for the first time, a channel dependency relationship induced from a communication fault needs to be added to an initial channel dependency graph, and a channel dependency graph to which the channel dependency relationship is already added is an updated channel dependency graph.

If it is not the first time that the routing network becomes faulty, a channel dependency relationship induced from this fault needs to be added to a channel dependency graph that is obtained a channel dependency relationship is added at a previous time.

The channel dependency graph is defined as follows: each node in a channel dependency graph denotes one channel in a routing network, and a symbol L1,2 in the channel dependency graph denotes one channel. If there is an arrow between $L_{1,2}$ and $L_{2,4}$, as shown in FIG. 4A, this indicates that the channel $L_{1,2}$ and the channel $L_{2,4}$ depend on each other.

Step 103. Determine the to-be-verified intermediate routing node as a final intermediate routing node that is used to transfer the to-be-transmitted data when the updated channel dependency graph does not have a dependency relationship loop, where the dependency relationship loop is a loop constituted by a channel dependency relationship combination.

In this embodiment of the present disclosure, when there is a fault in a communication path between two routing nodes, at least one intermediate routing node that is used to transfer to-be-transmitted data between the two routing nodes is determined, a channel dependency relationship between a to-be-verified intermediate routing node and the two routing nodes is added to a channel dependency graph of a routing network in which this fault has not occurred in order to enable the channel dependency graph to become an updated channel dependency graph, where the to-be-verified intermediate routing node is any one of the at least one intermediate routing node, the channel dependency relationship is a combination of channels in which the two routing nodes perform data transmission using the to-be-verified intermediate routing node, and the channel dependency graph of the routing network in which this fault has not occurred is used to describe a channel constituted by any two routing nodes in the routing network in which this fault has not occurred, or a combination of a channel constituted by any two routing nodes in the routing network in which this fault has not occurred and a channel dependency relationship that is established before the fault, and when the updated channel dependency graph does not have a dependency relationship loop, the to-be-verified intermediate routing node is determined as a final intermediate routing node that is used to transfer the to-be-transmitted data, where the dependency relationship loop is a loop constituted by a channel dependency relationship combination. In comparison with the conventional approaches in which data transfer needs to depend on multiple virtual channels to prevent a routing deadlock, according to the method provided in the embodiments of the present disclosure, an intermediate routing node that does not have a dependency relationship loop in a channel dependency graph may be determined by verifying, before determining the intermediate routing node, whether the intermediate routing node constitutes a dependency relationship loop in the channel dependency graph. When a communication fault occurs between two routing nodes, to-be-transmitted data may be transferred using only one intermediate routing node, without requiring that multiple virtual channels be in an idle and ready state. This improves resource utilization of a routing network. Therefore, in a network with same resources as a network in the conventional approaches, a fault-tolerance capability is more powerful and network performance is better in this solution.

Optionally, based on the embodiment corresponding to FIG. 11, in another embodiment of a method for determining an intermediate routing node according to the embodiments of the present disclosure, the adding a channel dependency relationship between a to-be-verified intermediate routing node and the two routing nodes to a channel dependency graph of a routing network in which this fault has not occurred in order to enable the channel dependency graph to become an updated channel dependency graph may include searching, according to a transmission direction of the to-be-transmitted data, the channel dependency graph of the routing network in which this fault has not occurred, to find a last channel in a path between a source routing node of the two routing nodes and the to-be-verified intermediate routing node and a first channel in a path between the to-be-verified intermediate routing node and a destination routing node of the two routing nodes, determining the last channel in the path between the source routing node and the to-be-verified intermediate routing node as a dependency start channel, and determining the first channel in the path between the to-be-verified intermediate routing node and the destination routing node as a dependency end channel, and adding, to the channel dependency graph of the routing network in which this fault has not occurred, a channel dependency relationship that is from the dependency start channel to the dependency end channel such that the channel dependency graph of the routing network in which this fault has not occurred becomes the updated channel dependency graph.

In this embodiment of the present disclosure, a communication path between a source routing node, a to-be-verified intermediate routing node, and a destination routing node is constituted by connecting multiple channels in series. Channels from the source routing node to the to-be-verified intermediate routing node are respectively defined as a first channel, a second channel, . . . , and a last channel starting from the source routing node, and channels from the to-be-verified intermediate routing node to the destination routing node are respectively defined as a first channel, a second channel, . . . , and a last channel starting from the to-be-verified intermediate routing node.

A process described in this embodiment of the present disclosure is a process of adding a line to a channel dependency graph, for example, a process of adding an arrow between the described $L_{1,2}$ and $L_{2,4}$ in FIG. 1 to FIG. 10, and details are not described herein.

Optionally, based on the embodiment corresponding to FIG. 11 or the optional embodiment corresponding to FIG. 11, in another embodiment of a method for determining an intermediate routing node according to the embodiments of the present disclosure, the determining at least one intermediate routing node that is used to transfer to-be-transmitted data between the two routing nodes may include obtaining, as a first information set, information about a routing node in a fault-free communication connection to the source routing node of the two routing nodes, obtaining, as a second information set, information about a routing node in a fault-free communication connection to the destination routing node of the two routing nodes, calculating an intersection set of the first information set and the second information set, and determining, as the at least one intermediate routing node, a routing node corresponding to routing node information included in the intersection set.

A process described in this embodiment of the present disclosure is a process of step 2 to step 4 that are described in the foregoing FIG. 1 to FIG. 10, and details are not described herein.

Optionally, based on the embodiment corresponding to FIG. 11 or the optional embodiment corresponding to FIG.

11, in another embodiment of a method for determining an intermediate routing node according to the embodiments of the present disclosure, before the adding a channel dependency relationship between a to-be-verified intermediate routing node and the two routing nodes to a channel dependency graph of a routing network in which this fault has not occurred in order to enable the channel dependency graph to become an updated channel dependency graph, the method may further include obtaining, as the channel dependency graph of the routing network in which this fault has not occurred, a channel dependency graph that does not include a dependency relationship loop and that is obtained a channel dependency relationship is added at a previous time.

The channel dependency graph of the routing network in which this fault has not occurred and that is described in this embodiment of the present disclosure is saved upon a previous update of a channel dependency graph and needs only to be directly read, which can improve efficiency in obtaining an updated channel dependency graph.

Optionally, based on the embodiment corresponding to FIG. 11 or the optional embodiment corresponding to FIG. 11, in another embodiment of a method for determining an intermediate routing node according to the embodiments of the present disclosure, the method may further include sending description information of the final intermediate routing node to the source routing node of the two routing nodes such that the source routing node sends the to-be-transmitted data to the final intermediate routing node.

In this embodiment of the present disclosure, after obtaining description information of a final intermediate routing node, a source routing node may directly send to-be-transmitted data according to the description information of the final intermediate routing node, and according to this embodiment of the present disclosure, a routing network needs only communication paths from the source routing node to the final intermediate routing node and from the final intermediate routing node to a destination routing node, without requiring that another communication path be always in an idle and ready state. This improves resource utilization of the routing network.

Figure 12:
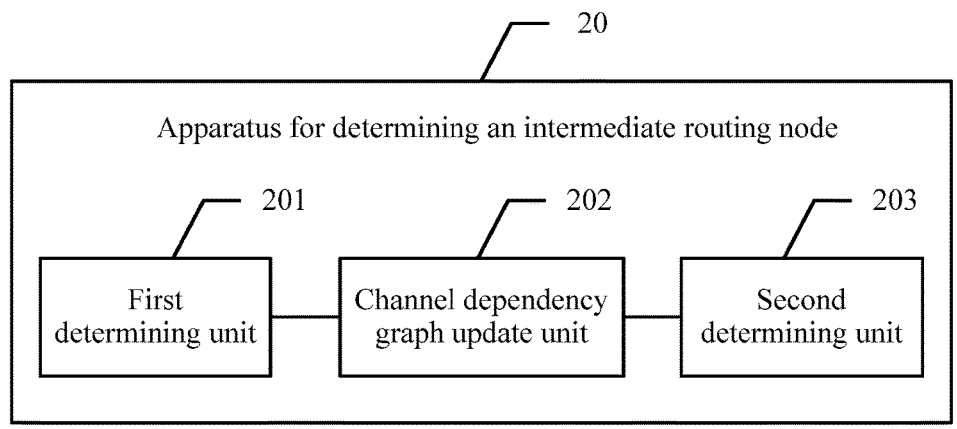
FIG. 12 is a schematic diagram of an embodiment of an apparatus for determining an intermediate routing node according to the embodiments of the present disclosure.

Referring to FIG. 12, an embodiment of an apparatus 20 for determining an intermediate routing node according to the embodiments of the present disclosure includes a first determining unit 201 configured to determine at least one intermediate routing node that is used to transfer to-be-transmitted data between the two routing nodes when there is a fault in a communication path between two routing nodes, a channel dependency graph update unit 202 configured to add a channel dependency relationship between a to-be-verified intermediate routing node and the two routing nodes to a channel dependency graph of a routing network in which this fault has not occurred in order to enable the channel dependency graph to become an updated channel dependency graph, where the to-be-verified intermediate routing node is any one of the at least one intermediate routing node determined by the first determining unit, the channel dependency relationship is a combination of channels in which the two routing nodes perform data transmission using the to-be-verified intermediate routing node, and the channel dependency graph of the routing network in which this fault has not occurred is used to describe a channel constituted by any two routing nodes in the routing network in which this fault has not occurred, or a combination of a channel constituted by any two routing nodes in the routing network in which this fault has not occurred and a channel dependency relationship that is established before the fault, and a second determining unit 203 configured to determine the to-be-verified intermediate routing node as a final intermediate routing node that is used to transfer the to-be-transmitted data when the updated channel dependency graph updated by the channel dependency graph update unit 202 does not have a dependency relationship loop, where the dependency relationship loop is a loop constituted by a channel dependency relationship combination.

In this embodiment of the present disclosure, when there is a fault in a communication path between two routing nodes, a first determining unit 201 determines at least one intermediate routing node that is used to transfer to-be-transmitted data between the two routing nodes, a channel dependency graph update unit 202 adds a channel dependency relationship between a to-be-verified intermediate routing node and the two routing nodes to a channel dependency graph of a routing network in which this fault has not occurred in order to enable the channel dependency graph to become an updated channel dependency graph, where the to-be-verified intermediate routing node is any one of the at least one intermediate routing node determined by the first determining unit, the channel dependency relationship is a combination of channels in which the two routing nodes perform data transmission using the to-be-verified intermediate routing node, and the channel dependency graph of the routing network in which this fault has not occurred is used to describe a channel constituted by any two routing nodes in the routing network in which this fault has not occurred, or a combination of a channel constituted by any two routing nodes in the routing network in which this fault has not occurred and a channel dependency relationship that is established before the fault, and when the updated channel dependency graph updated by the channel dependency graph update unit 202 does not have a dependency relationship loop, a second determining unit 203 determines the to-be-verified intermediate routing node as a final intermediate routing node that is used to transfer the to-be-transmitted data, where the dependency relationship loop is a loop constituted by a channel dependency relationship combination. In comparison with the conventional approaches in which data transfer needs to depend on multiple virtual channels to prevent a routing deadlock, according to the apparatus provided in this embodiment of the present disclosure, an intermediate routing node that does not have a dependency relationship loop in a channel dependency graph may be determined by verifying, before determining the intermediate routing node, whether the intermediate routing node constitutes a dependency relationship loop in the channel dependency graph. When a communication fault occurs between two routing nodes, to-be-transmitted data may be transferred using only one intermediate routing node, without requiring that multiple virtual channels be in an idle and ready state. This improves resource utilization of a routing network. Therefore, in a network with same resources as a network in the conventional approaches, a fault-tolerance capability is more powerful and network performance is better in this solution.

Figure 13:
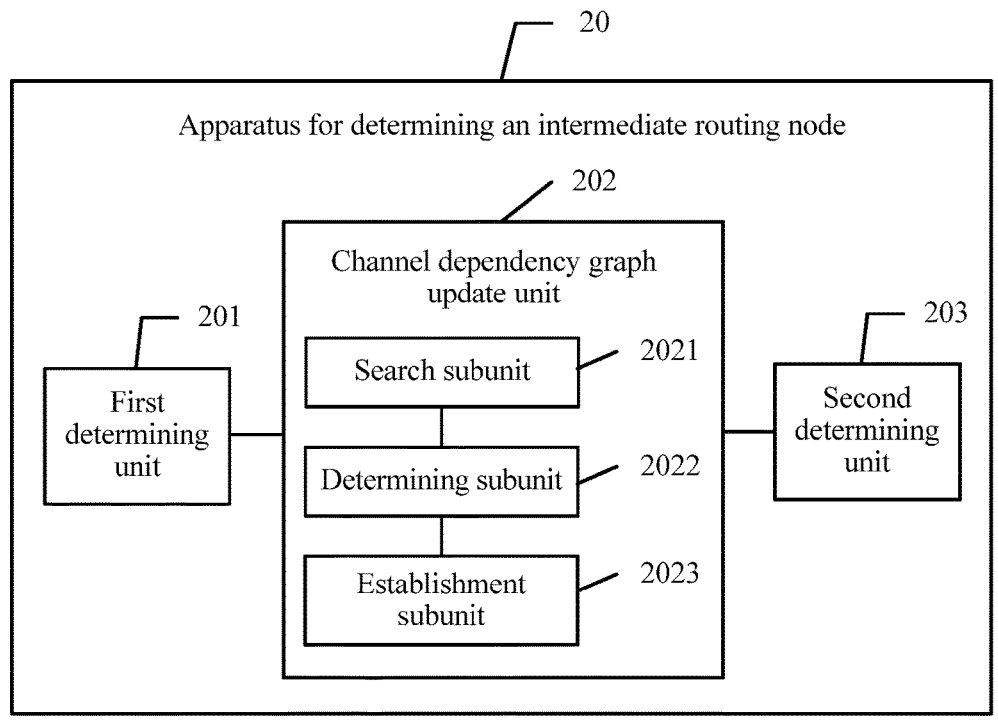
FIG. 13 is a schematic diagram of another embodiment of an apparatus for determining an intermediate routing node according to the embodiments of the present disclosure.

Optionally, based on the embodiment corresponding to FIG. 12, referring to FIG. 13, in another embodiment of the apparatus 20 for determining an intermediate routing node according to the embodiments of the present disclosure, the channel dependency graph update unit 202 includes a search subunit 2021 configured to search, according to a transmission direction of the to-be-transmitted data, the channel dependency graph of the routing network in which this fault has not occurred in order to find a last channel in a path between a source routing node of the two routing nodes and the to-be-verified intermediate routing node and a first channel in a path between the to-be-verified intermediate routing node and a destination routing node of the two routing nodes, a determining subunit 2022 configured to determine the last channel, found by the search subunit 2021, in the path between the source routing node and the to-be-verified intermediate routing node as a dependency start channel, and to determine the first channel, found by the search subunit 2021, in the path between the to-be-verified intermediate routing node and the destination routing node as a dependency end channel, and an establishment subunit 2023 configured to add, to the channel dependency graph of the routing network in which this fault has not occurred, a channel dependency relationship that is from the dependency start channel to the dependency end channel, where the dependency start channel and the dependency end channel are determined by the determining subunit 2022 such that the channel dependency graph of the routing network in which this fault has not occurred becomes the updated channel dependency graph.

Figure 14:
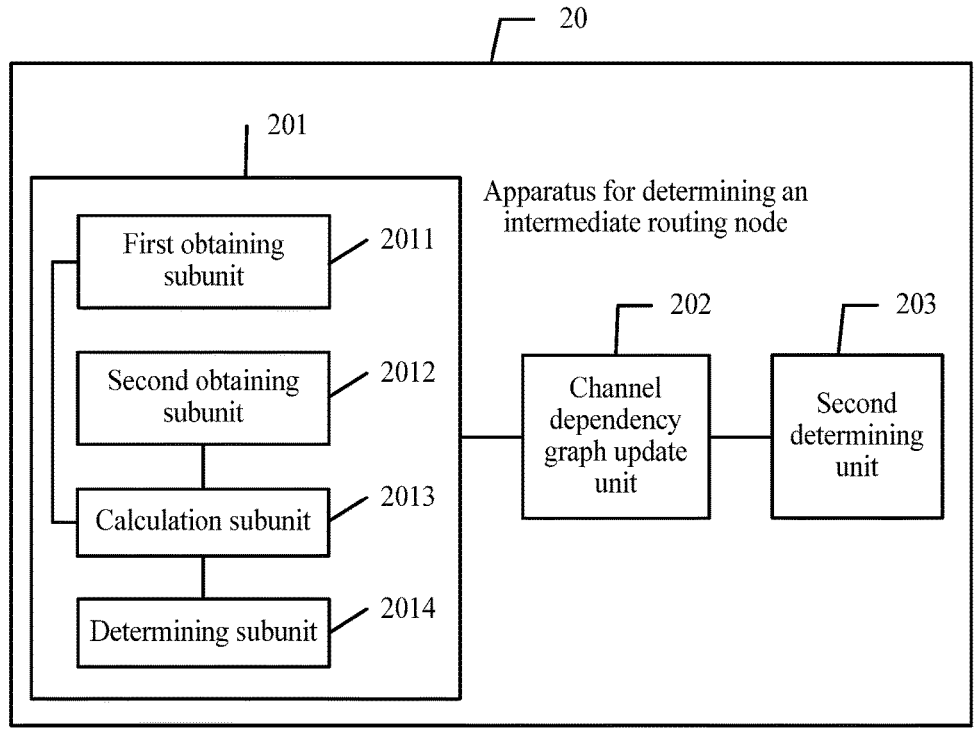
FIG. 14 is a schematic diagram of another embodiment of an apparatus for determining an intermediate routing node according to the embodiments of the present disclosure.

Optionally, based on the embodiment corresponding to FIG. 10, referring to FIG. 14, in another embodiment of the apparatus 20 for determining an intermediate routing node according to the embodiments of the present disclosure, the first determining unit 201 includes a first obtaining subunit 2011 configured to obtain, as a first information set, information about a routing node in a fault-free communication connection to the source routing node of the two routing nodes, a second obtaining subunit 2012 configured to obtain, as a second information set, information about a routing node in a fault-free communication connection to the destination routing node of the two routing nodes, a calculation subunit 2013 configured to calculate an intersection set of the first information set obtained by the first obtaining subunit 2011 and the second information set obtained by the second obtaining subunit 2012, and a determining subunit 2014 configured to determine, as the at least one intermediate routing node, a routing node corresponding to routing node information included in the intersection set calculated by the calculation subunit 2013.

Figure 15:
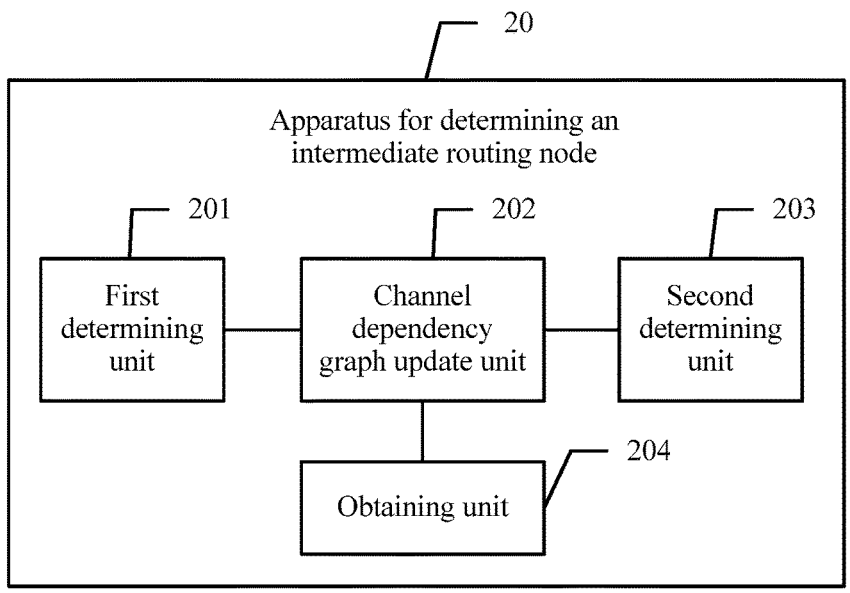
FIG. 15 is a schematic diagram of another embodiment of an apparatus for determining an intermediate routing node according to the embodiments of the present disclosure.

Optionally, based on the embodiment corresponding to FIG. 12, referring to FIG. 15, in another embodiment of the apparatus 20 for determining an intermediate routing node according to the embodiments of the present disclosure, the apparatus 20 further includes an obtaining unit 204 configured to obtain, as the channel dependency graph of the routing network in which this fault has not occurred, a channel dependency graph that does not include a dependency relationship loop and that is obtained a channel dependency relationship is added at a previous time before the channel dependency graph update unit 202 updates the channel dependency graph of the routing network in which this fault has not occurred.

Figure 16:
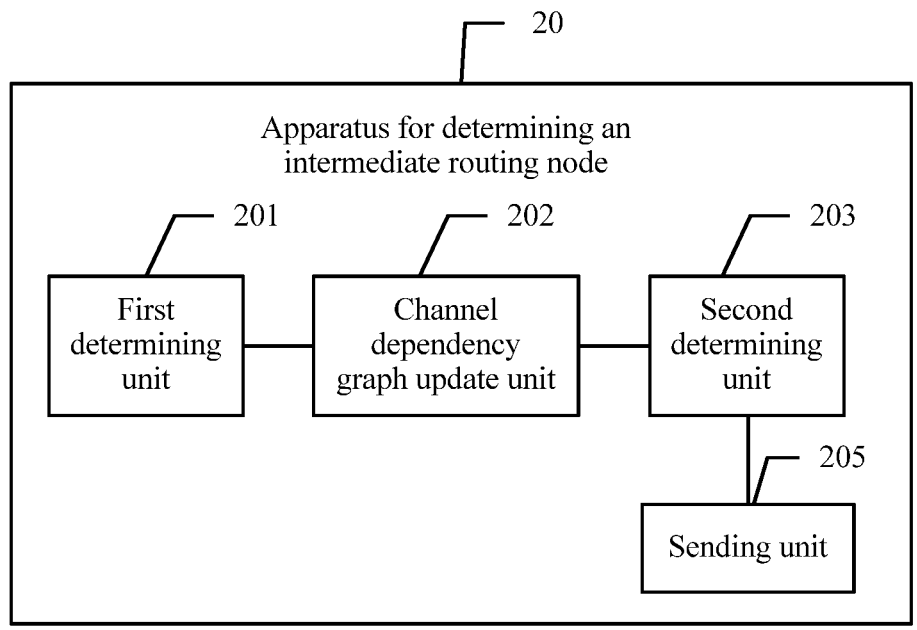
FIG. 16 is a schematic diagram of another embodiment of an apparatus for determining an intermediate routing node according to the embodiments of the present disclosure.

Optionally, based on the embodiment corresponding to FIG. 12, referring to FIG. 16, in another embodiment of the apparatus 20 for determining an intermediate routing node according to the embodiments of the present disclosure, the apparatus 20 further includes a sending unit 205 configured to send description information of the final intermediate routing node determined by the second determining unit 203 to the source routing node of the two routing nodes such that the source routing node sends the to-be-transmitted data to the final intermediate routing node.

Figure 17:
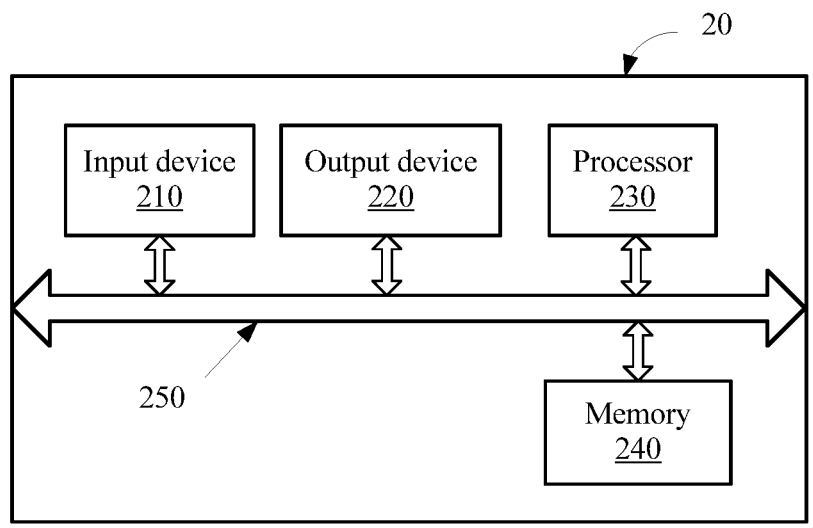
FIG. 17 is a schematic diagram of another embodiment of an apparatus for determining an intermediate routing node according to the embodiments of the present disclosure.

FIG. 17 is a schematic structural diagram of an apparatus 20 for determining an intermediate routing node according to an embodiment of the present disclosure. The apparatus 20 for determining an intermediate routing node may include an input device 210, an output device 220, a processor 230, and a memory 240. The memory 240 may include a read-only memory and a random access memory, and provides an instruction and data to the processor 230. A part of the memory 240 may further include a non-volatile random access memory (NVRAM).

The memory 240 stores elements such as an executable module or a data structure, or a subset thereof, or an extended set thereof, operation instruction, including various operation instructions and used to implement various operations, and operating system, including various system programs and configured to implement various basic services and process a hardware-based task.

In this embodiment of the present disclosure, the processor 230 performs the following operations by invoking an operation instruction (this operation instruction may be stored in an operating system) stored in the memory 240 determining at least one intermediate routing node that is used to transfer to-be-transmitted data between the two routing nodes when there is a fault in a communication path between two routing nodes, adding a channel dependency relationship between a to-be-verified intermediate routing node and the two routing nodes to a channel dependency graph of a routing network in which this fault has not occurred in order to enable the channel dependency graph to become an updated channel dependency graph, where the to-be-verified intermediate routing node is any one of the at least one intermediate routing node, the channel dependency relationship is a combination of channels in which the two routing nodes perform data transmission using the to-be-verified intermediate routing node, and the channel dependency graph of the routing network in which this fault has not occurred is used to describe a channel constituted by any two routing nodes in the routing network in which this fault has not occurred, or a combination of a channel constituted by any two routing nodes in the routing network in which this fault has not occurred and a channel dependency relationship that is established before the fault, and when the updated channel dependency graph does not have a dependency relationship loop, determining the to-be-verified intermediate routing node as a final intermediate routing node that is used to transfer the to-be-transmitted data, where the dependency relationship loop is a loop constituted by a channel dependency relationship combination.

According to this embodiment of the present disclosure, before determining an intermediate routing node, an apparatus 20 for determining an intermediate routing node verifies whether the intermediate routing node constitutes a dependency relationship loop in a channel dependency graph such that an intermediate routing node that does not have a dependency relationship loop in the channel dependency graph may be determined, and when a communication fault occurs between two routing nodes, to-be-transmitted data may be transferred using only one intermediate routing node, without requiring that multiple virtual channels be in an idle and ready state. This improves resource utilization of a routing network. Therefore, in a network with same resources as a network in the conventional approaches, a fault-tolerance capability is more powerful and network performance is better in this solution.

The processor 230 controls an operation of the apparatus 20 for determining an intermediate routing node. The processor 230 may also be referred to as a central processing unit (CPU). The memory 240 may include a read-only memory and a random access memory, and provides an instruction and data to the processor 230. A part of the memory 240 may further include a NVRAM. In specific application, all components of the apparatus 20 for determining an intermediate routing node are coupled together using a bus system 250, where the bus system 250 may further include a power bus, a control bus, a status signal bus, and the like in addition to a data bus. However, for clear description, all types of buses are marked as the bus system 250 in FIG. 18.

The method disclosed in the embodiments of the present disclosure may be applied to the processor 230 or implemented by the processor 230. The processor 230 may be an integrated circuit chip with a signal processing capability. In an implementation process, steps of the foregoing method may be performed by an integrated logical circuit in hardware or by an instruction in a form of software in the processor 230. The foregoing processor 230 may be a general purpose processor, a digital signal processor (DSP), an application-specific integrated circuit (ASIC), a field programmable gate array (FPGA) or another programmable logic device, a discrete gate or a transistor logic device, or a discrete hardware assembly, and may implement or execute the methods, steps, and logical block diagrams that are disclosed in the embodiments of the present disclosure. The general purpose processor may be a microprocessor or the processor may be any conventional processor or the like. Steps of the method disclosed with reference to the embodiments of the present disclosure may be directly reflected as being executed by a decoding processor in a form of hardware, or may be executed using a combination of hardware and software modules in a decoding processor. The software module may be located in a mature storage medium in the conventional approaches, such as a random access memory, a flash memory, a read-only memory, a programmable read-only memory or an electrically-erasable programmable memory, or a register. The storage medium is located in the memory 240, and the processor 230 reads information from the memory 240 and performs, with reference to hardware thereof, the steps in the foregoing methods.

Optionally, the processor 230 may further search, according to a transmission direction of the to-be-transmitted data, the channel dependency graph of the routing network in which this fault has not occurred in order to find a last channel in a path between a source routing node of the two routing nodes and the to-be-verified intermediate routing node and a first channel in a path between the to-be-verified intermediate routing node and a destination routing node of the two routing nodes, determine the last channel in the path between the source routing node and the to-be-verified intermediate routing node as a dependency start channel, and determine the first channel in the path between the to-be-verified intermediate routing node and the destination routing node as a dependency end channel, and add, to the channel dependency graph of the routing network in which this fault has not occurred, a channel dependency relationship that is from the dependency start channel to the dependency end channel such that the channel dependency graph of the routing network in which this fault has not occurred becomes the updated channel dependency graph.

Optionally, the processor 230 may further obtain, as a first information set, information about a routing node in a fault-free communication connection to the source routing node of the two routing nodes, obtain, as a second information set, information about a routing node in a fault-free communication connection to the destination routing node of the two routing nodes, and calculate an intersection set of the first information set and the second information set, and determine, as the at least one intermediate routing node, a routing node corresponding to routing node information included in the intersection set.

Optionally, the processor 230 may further obtain, as the channel dependency graph of the routing network in which this fault has not occurred, a channel dependency graph that does not include a dependency relationship loop and that is obtained a channel dependency relationship is added at a previous time before the adding a channel dependency relationship between a to-be-verified intermediate routing node and the two routing nodes to a channel dependency graph of a routing network in which this fault has not occurred in order to enable the channel dependency graph to become an updated channel dependency graph.

Optionally, the output device 220 may be configured to send description information of the intermediate routing node to the source routing node of the two routing nodes such that the source routing node sends the to-be-transmitted data to the intermediate routing node.

Figure 18:
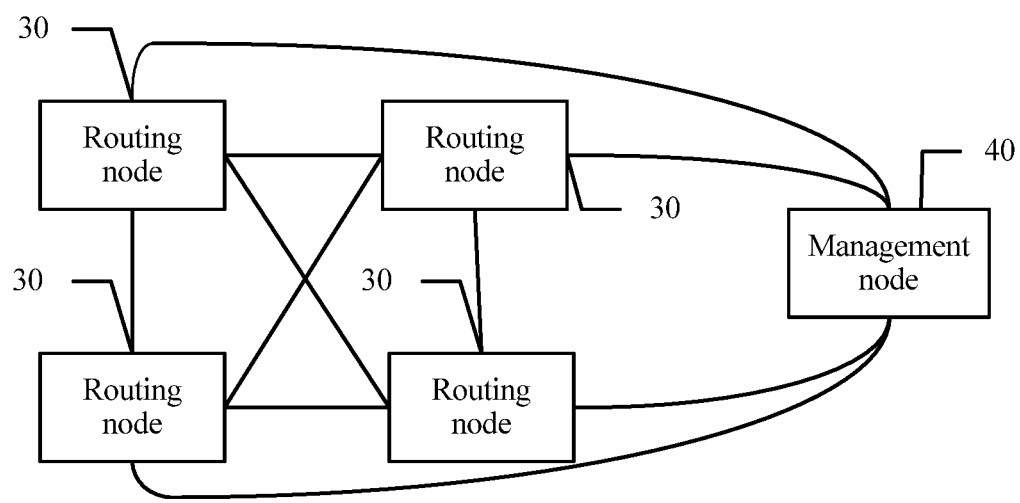
FIG. 18 is a schematic diagram of an embodiment of a routing control system according to the embodiments of the present disclosure.

Referring to FIG. 18, a routing control system according to the embodiments of the present disclosure includes a routing node 30 and a management node 40, where any two routing nodes of the routing node 30 are in a communication connection in a manner defined according to a network topology, and there is a communication connection between the management node 40 and any routing node of the routing node 30.

In FIG. 18, only several routing nodes 30 are drawn. In practice, there may be many routing nodes 30. It may be understood that not all are drawn in FIG. 18. In one embodiment, the management node 40 is configured to determine at least one intermediate routing node that is used to transfer to-be-transmitted data between the two routing nodes when there is a fault in a communication path between two routing nodes, add a channel dependency relationship between a to-be-verified intermediate routing node and the two routing nodes to a channel dependency graph of a routing network in which this fault has not occurred in order to enable the channel dependency graph to become an updated channel dependency graph, where the to-be-verified intermediate routing node is any one of the at least one intermediate routing node, the channel dependency relationship is a combination of channels in which the two routing nodes perform data transmission using the to-be-verified intermediate routing node, and the channel dependency graph of the routing network in which this fault has not occurred is used to describe a channel constituted by any two routing nodes in the routing network in which this fault has not occurred, or a combination of a channel constituted by any two routing nodes in the routing network in which this fault has not occurred and a channel dependency relationship that is established before the fault, and determine the to-be-verified intermediate routing node as a final intermediate routing node that is used to transfer the to-be-transmitted data when the updated channel dependency graph does not have a dependency relationship loop, where the dependency relationship loop is a loop constituted by a channel dependency relationship combination.

In comparison with the conventional approaches in which data transfer needs to depend on multiple virtual channels to prevent a routing deadlock, according to the method provided in the embodiments of the present disclosure, an intermediate routing node that does not have a dependency relationship loop in a channel dependency graph may be determined by verifying, before determining the intermediate routing node, whether the intermediate routing node constitutes a dependency relationship loop in the channel dependency graph. When a communication fault occurs between two routing nodes, to-be-transmitted data may be transferred using only one intermediate routing node, without requiring that multiple virtual channels be in an idle and ready state. This improves resource utilization of a routing network. Therefore, in a network with same resources as a network in the conventional approaches, a fault-tolerance capability is more powerful and network performance is better in this solution.

A person of ordinary skill in the art may understand that all or a part of the steps of the methods in the embodiments may be implemented by a program instructing relevant hardware. The program may be stored in a computer readable storage medium. The storage medium may include: a read only memory (ROM), a random access memory (RAM), a magnetic disk, or an optical disc.

The method for determining an intermediate routing node and apparatus and the system provided in the embodiments of the present disclosure are described in detail above. The principle and implementation of the present disclosure are described herein through specific examples. The description about the embodiments is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limitation to the present disclosure.

What is claimed is:

1. A method for determining an intermediate routing node, comprising:
   determining at least one intermediate routing node that is used to transfer to-be-transmitted data between two routing nodes when there is a fault in a communication path between the two routing nodes;
   adding a channel dependency relationship between a to-be-verified intermediate routing node and the two routing nodes to a channel dependency graph of a routing network in which this fault has not occurred in order to enable the channel dependency graph to become an updated channel dependency graph, wherein the to-be-verified intermediate routing node is any one of the at least one intermediate routing node, wherein the channel dependency relationship is a combination of channels in which the two routing nodes perform data transmission using the to-be-verified intermediate routing node, and wherein the channel dependency graph of the routing network in which this fault has not occurred is used to describe a dependency relationship constituted by any two channels in the routing network in which this fault has not occurred, or a combination of a dependency relationship constituted by any two channels in the routing network in which this fault has not occurred and a channel dependency relationship that is established before the fault; and
   determining the to-be-verified intermediate routing node as a final intermediate routing node that is used to transfer the to-be-transmitted data when the updated channel dependency graph does not have a dependency relationship loop,
   wherein the dependency relationship loop is a loop constituted by a channel dependency relationship combination.

2. The method according to claim 1, wherein adding the channel dependency relationship between the to-be-verified intermediate routing node and the two routing nodes to the channel dependency graph of the routing network in which this fault has not occurred in order to enable the channel dependency graph to become the updated channel dependency graph comprises:
   searching, according to a transmission direction of the to-be-transmitted data, the channel dependency graph of the routing network in which this fault has not occurred, to find a last channel in a path between a source routing node of the two routing nodes and the to-be-verified intermediate routing node and a first channel in a path between the to-be-verified intermediate routing node and a destination routing node of the two routing nodes;
   determining the last channel in the path between the source routing node and the to-be-verified intermediate routing node as a dependency start channel;
   determining the first channel in the path between the to-be-verified intermediate routing node and the destination routing node as a dependency end channel; and
   adding, to the channel dependency graph of the routing network in which this fault has not occurred, a channel dependency relationship that is from the dependency start channel to the dependency end channel such that the channel dependency graph of the routing network in which this fault has not occurred becomes the updated channel dependency graph.

3. The method according to claim 1, wherein determining the at least one intermediate routing node that is used to transfer the to-be-transmitted data between the two routing nodes comprises:
   obtaining, as a first information set, information about a routing node in a fault-free communication connection to the source routing node of the two routing nodes;
   obtaining, as a second information set, information about a routing node in a fault-free communication connection to the destination routing node of the two routing nodes;
   calculating an intersection set of the first information set and the second information set; and
   determining, as the at least one intermediate routing node, a routing node corresponding to routing node information comprised in the intersection set.

4. The method according to claim 1, wherein before adding the channel dependency relationship between the to-be-verified intermediate routing node and the two routing nodes to the channel dependency graph of the routing network in which this fault has not occurred in order to enable the channel dependency graph to become the updated channel dependency graph, the method further comprises obtaining, as the channel dependency graph of the routing network in which this fault has not occurred, a channel dependency graph that does not comprise a dependency relationship loop and that is obtained a channel dependency relationship is added at a previous time.

5. The method according to claim 1, wherein the method further comprises sending description information of the final intermediate routing node to the source routing node of the two routing nodes such that the source routing node sends the to-be-transmitted data to the final intermediate routing node.

6. An apparatus for determining an intermediate routing node, comprising:
   a processor; and
   a memory coupled to the processor,
   wherein the memory has a plurality of instructions stored thereon, that when executed by the processor, cause the processor to:

determine at least one intermediate routing node that is used to transfer to-be-transmitted data between two routing nodes when there is a fault in a communication path between the two routing nodes;

add a channel dependency relationship between a to-be-verified intermediate routing node and the two routing nodes to a channel dependency graph of a routing network in which this fault has not occurred in order to enable the channel dependency graph to become an updated channel dependency graph, wherein the to-be-verified intermediate routing node is any one of the at least one intermediate routing node, wherein the channel dependency relationship is a combination of channels in which the two routing nodes perform data transmission using the to-be-verified intermediate routing node, and wherein the channel dependency graph of the routing network in which this fault has not occurred is used to describe a dependency relationship constituted by any two channels in the routing network in which this fault has not occurred, or a combination of a dependency relationship constituted by any two channels in the routing network in which this fault has not occurred and a channel dependency relationship that is established before the fault; and determine the to-be-verified intermediate routing node as a final intermediate routing node that is used to transfer the to-be-transmitted data when the updated channel dependency graph does not have a dependency relationship loop, wherein the dependency relationship loop is a loop constituted by a channel dependency relationship combination.

7. The apparatus according to the claim 6, wherein the instructions further cause the processor to:

search, according to a transmission direction of the to-be-transmitted data, the channel dependency graph of the routing network in which this fault has not occurred, to find a last channel in a path between a source routing node of the two routing nodes and the to-be-verified intermediate routing node and a first channel in a path between the to-be-verified intermediate routing node and a destination routing node of the two routing nodes;

determine the last channel in the path between the source routing node and the to-be-verified intermediate routing node as a dependency start channel;

determine the first channel in the path between the to-be-verified intermediate routing node and the destination routing node as a dependency end channel; and add, to the channel dependency graph of the routing network in which this fault has not occurred, a channel dependency relationship that is from the dependency start channel to the dependency end channel such that the channel dependency graph of the routing network in which this fault has not occurred becomes the updated channel dependency graph.

8. The apparatus according to the claim 6, wherein the instructions further cause the processor to:

obtain, as a first information set, information about a routing node in a fault-free communication connection to the source routing node of the two routing nodes;

obtain, as a second information set, information about a routing node in a fault-free communication connection to the destination routing node of the two routing nodes;

calculate an intersection set of the first information set and the second information set; and determine, as the at least one intermediate routing node, a routing node corresponding to routing node information comprised in the intersection set.

9. The apparatus according to the claim 6, wherein the instructions further cause the processor to obtain, as the channel dependency graph of the routing network in which this fault has not occurred, a channel dependency graph that does not comprise a dependency relationship loop and that is obtained a channel dependency relationship is added at a previous time.

10. The apparatus according to the claim 6, wherein the instructions further cause the processor to send description information of the final intermediate routing node to the source routing node of the two routing nodes such that the source routing node sends the to-be-transmitted data to the final intermediate routing node.

* * * * *